Oct. 26, 1971          L. M. DOUGLAS          3,614,919
APERTURE DEFINING EXPOSURE CONTROL SYSTEM
Filed Dec. 16, 1968                    3 Sheets-Sheet 1

INVENTOR.
LAWRENCE M. DOUGLAS
BY Brown and Mikulka
and
Gerald L. Smith
ATTORNEYS Oct. 26, 1971  L. M. DOUGLAS  3,614,919
APERTURE DEFINING EXPOSURE CONTROL SYSTEM
Filed Dec. 16, 1968  3 Sheets-Sheet 2

INVENTOR.
LAWRENCE M. DOUGLAS
BY Brown and Mikulka
and
Gerald L. Smith
ATTORNEYS INVENTOR.
LAWRENCE M. DOUGLAS
BY Brown and Mikulka
and
Gerald L. Smith
ATTORNEYS United States Patent Office 3,614,919
Patented Oct. 26, 1971

3,614,919
APERTURE DEFINING EXPOSURE CONTROL SYSTEM
Lawrence M. Douglas, Easton, Mass., assignor to Polaroid Corporation, Cambridge, Mass.
Filed Dec. 16, 1968, Ser. No. 784,064
Int. Cl. G03b 7/08, 9/06
U.S. Cl. 95—10 C                29 Claims

ABSTRACT OF THE DISCLOSURE

An automatic aperture control system for photographic apparatus which provides for continuous as opposed to incremental regulation of aperture dimension. Aperture defining blades are linked cooperatively and driven to diverge from a position defining a minimum aperture to a position defining a maximum aperture. In response to a control signal, an electromagnetically actuated braking mechanism halts the movement of the blades when they reach a proper aperture defining orientation. The brake is characterized in using a pivotally mounted lever having an end which frictionally contacts the surface of at least one of the moving blades in a manner such that it assumes a compressive force counteracting any tendency for further movement of the blades.

---

The present invention relates to exposure control systems for photographic apparatus and more particularly to a control system which automatically regulates the aperture setting of such apparatus.

BACKGROUND OF THE INVENTION

Automatic exposure control systems for photographic devices have taken many forms, depending upon the exposure evaluating program under which the systems are called upon to operate. Where the programs require automatic regulation of aperture size, a mechanical aperture defining implement must be adjusted within a photographic optical path until it corresponds with an exposure evaluation derived elsewhere in the system. This adjustment is typically provided by an electromechanical arrangement which controls the movement of an aperture defining diaphragm or blade member in response to an electrical signal representing an exposure value. To perform this adjustment with a desired rapidity, the mechanical manipulation is typically carried out under a control program providing regulation only at a number of predetermined aperture stops or openings. This multistop format for aperture adjustment serves to overcome a number of system design complexities. An overcoming of such design difficulty, however, must be made at the expense of a broader exposure control latitude. Such latitude would otherwise be available with the automatic regulation of a continuously variable diaphragm mechanism. These continuously variable mechanisms theoretically are capable of providing an infinity of aperture opening selections between predetermined maximum and minimum limits.

The suggested design complexities encountered in providing continuously variable aperture controls stem mainly from the mechanical characteristics of typical photographic aperture adjustment mechanisms. Generally, the blade mechanisms with which various aperture openings are formed or presented within an optional path are driven from one terminal position to another representing the extreme apertures available in an exposure control program. The mechanisms which conventionally perform this manipulation, by necessity, are of a delicate nature and derive only low force values for causing the adjustment of aperture elements. This form of mechanism is required inasmuch as the devices must react accurately, at relatively high rates, and are fashioned at somewhat miniaturized scale. In order to furnish a continuous form of aperture regulation, means must be provided for braking the movement of the blade mechanisms at any location along their locus of travel. The use of conventionally structured frictional braking structures for this purpose has been considered impractical inasmuch as such structures are not readily incorporated within the mechanical systems typically encountered in photographic exposure systems. For instance, typical frictional braking arrangements must develop spring forces of relatively high values in order to assure adequate response rates and requisite accuracies. Such forces, however, necessitate reduction linkages and the like, the presence of which militate against a rapid response characteristic. To overcome the reduced response rates of the braking systems, complex anticipatory arrangements must be inserted into the design and such additions are generally considered as impractical.

An approach commonly used to avoid the complexities encountered with conventional frictional brake structures provides a positive mechanical arrangement wherein a blocking implement is inserted into the driving mechanism used to provide aperture variation. For instance, a pin may be inserted between gear teeth otherwise functioning to drive an aperture mechanism, or a pawl and tooth mechanism may be incorporated within an aperture defining blade or diaphragm driving member. Such blocking implements require advantageously low force values for actuation and may operate within appropriately fast reaction times. With such arrangements high breaking response rates are available, however, the aperture adjustment which they provide must be incremental as opposed to the broadened continuous capability now desired.

The trend of modern camera design is towards conveniently small sizes. As a consequence, the mechanism providing for shutter and aperture control must be of relatively miniature dimension. The smaller dimensions or scales of constituent parts consequently encountered introduce difficulties in manufacturing mechanical elements of adequate tolerance. These tolerance requirements further hinder the development of more elaborate electromechanical aperture regulating systems.

SUMMARY OF THE INVENTION

The inventive aperture control system now presented provides highly responsive and continuous regulation of aperture dimension between the limits of a pre-programed exposure aperture interval. To derive an advantageously continuous adjustment over this interval, the aperture defining blade mechanism of the system is caused to continuously and progressively adjust from one terminal position to another representing the extreme apertures available over the above interval. A braking arrangement is inserted within the system which functions to halt the aperture defining motion of the diaphragm or multiblade arrangement as an aperture dimension corresponding to an exposure evaluation is reached. This braking arrangement, while operable under conventional frictional principles, retains the advantageous capability of halting aperture blade or diaphragm movement without resort to unacceptable force values. As a consequence, rapid response characteristics are available for the control system which are adequate to accommodate the mechanical dynamics encountered during the manipulation of an aperture defining mechanism between its programmed terminal positions.

In addition to providing advantageously rapid response rate by virtue of its operability under low force values, the braking system is fabricable at the miniaturized scaling required in modern camera design while the tolerances under which it is manufactured need not be exacting.

The braking arrangement of the invention is characterized in the incorporation of a braking lever pivotally mounted a selected fixed distance from the surface of the movable aperture defining blade or related mechanism. This lever is dimensioned with respect to its distance from the blade surface such that its tip is frictionally contactable with that surface at an angular orientation permitting it to assume a compressive force counteracting the movement or tendency for movement of the blade surface. In effect, the force applied to the blade or diaphragm mechanism is itself used for the purpose of deriving a retarding or braking force. As a consequence, the force values required for actuating the braking arrangement are minimal, representing those required to pivot the low mass lever into contact or engagement with the aperture blade system. Inasmuch as contact is provided with the surface of a diaphragm blade or the like, the translational movement of the blades may be halted at any location between their maximum or terminal positions. In theory, therefore, the aperture blades may be regulated to define an infinity of settings between their programmed limits. Since the brake structure of the system is a simple lever arrangement, it is readily fabricable at the miniaturized dimension required in modern camera exposure mechanism design. Considerable tolerance is available with respect to the angular orientation of the lever with the plane or surface of the diaphragm blades. As a consequence, the tolerances required in fabricating the lever as well as its pivotal mounting are simply met.

Another feature and object of the invention is to provide an automatic exposure control system and apparatus including an aperture defining diaphragm arrangement having at least one surface movable between terminal positions defining minimum and maximum apertures. Spring means are utilized for urging the diaphragm blade arrangement between these terminal positions. The system includes a braking lever pivotally mounted a fixed distance from the movable surface and having an end frictionally contactable with the surface in a manner providing a compressive force counteracting any movement of the blade surface when engaged with the surface. Circuit means are included with the system for generating an output signal representative of exposure evaluation and actuator means responsive to the output signal are arranged to cause the braking lever to frictionally contact the blade surface and halt the movement of the blade at any position defining an aperture representative of the exposure evaluation.

Other objects of the invention will in part be obvious and will in part appear hereinafter. The invention accordingly comprises the system and apparatus possessing the construction, combination, of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a fragmentary plane view of an aperture defining mechanism incorporating the braking arrangement utilized with the instant control system;

FIG. 5 is a pictorial and schematic representation of the braking arrangement of the invention depicting the braking function in force-vector fashion;

DETAILED DESCRIPTION OF THE DRAWINGS

The control system of the invention may be used with a variety of photographic exposure mechanisms. In the arrangement now described, the system is incorporated with an aperture diaphragm formed having two aperture defining blades. The blades of this diaphragm are mechanically linked and configured so as to provide simultaneous, oppositely directed and proportionate movement across the axis of a camera lens. A light sensitive circuit provides a light level evaluation of a scene to be photographed and a signal representative of this evaluation along with the instantaneous position of the diaphragm blades is utilized to electromagnetically actuate the braking mechanism.

Figure 3:
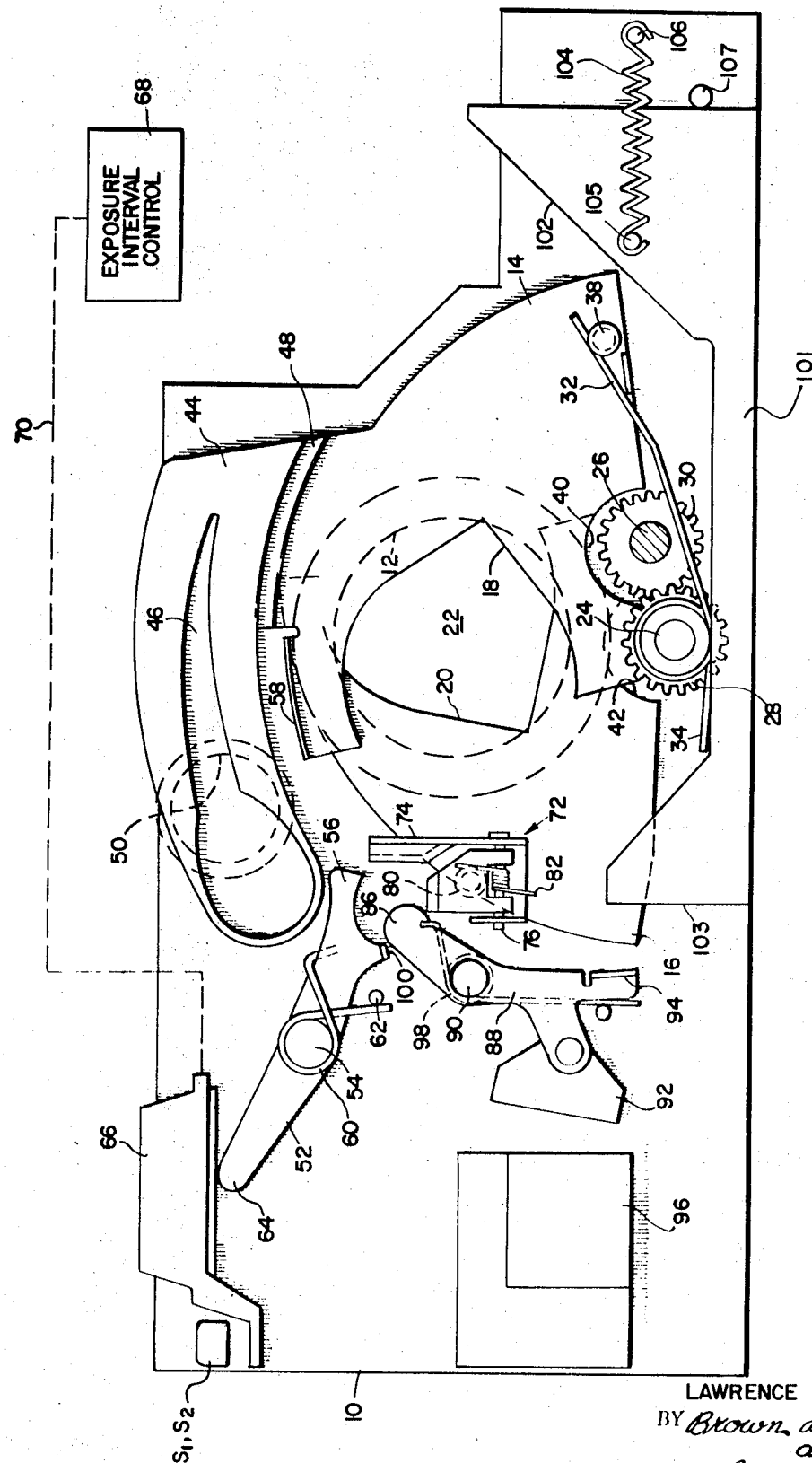
FIG. 3 is a plane view of an aperture defining mechanism for use with the instant control system, showing the elements thereof in position during an exposure sequence.

Referring to FIGS. 1 and 3, the aperture control mechanism is illustrated respectively in an orientation wherein the aperture blades are cocked in readiness for an exposure, and at a point in time following the commencement of an exposure sequence when an appropriate aperture has been defined. The regulating mechanism includes a camera base plate 10 upon which the regulatory components or elements of the mechanism are mounted. Base plate 10 is formed having a circular opening 12 coaxially aligned with the optical axis of the camera within which the aperture regulating mechanism is situated. Opening 12 is typically dimensioned having a diameter coextensive with the maximum aperture adjustment of the optical system. Aperture adjustment over the opening 12 is provided by a diaphragm arrangement formed of two aperture defining blades 14 and 16. Formed of planar opaque material, each of the blades 14 and 16 is configured having selectively contoured indentations or notches, the edges of which are shown respectively at 18 and 20. The notches within each blade are shaped and arranged so as to cooperate when overlapped to define an aperture opening 22 symmetrically formed about the optical axis of the camera lens system. Blades 14 and 16 are mounted for rotation upon the base plate 10 at pivotal shafts respectively shown at 24 and 26 which extend into base 10. To provide a coaction between each of the aperture blades, externally meshing spur gears 28 and 30 are journaled respectively over shafts 24 and 26 and fixed to blades 14 and 16. It will be apparent that the spur gears 28 and 30 permit a uniform synchronous and relative coaction between the aperture forming blades 14 and 16. Inasmuch as the aperture blades are linked for mutually opposed rotation through gears 28 and 30, only one of the blades need be driven to impart rotation to both. Accordingly, a singular wire spring 32 is mounted within the assembly having a stationary end 34 fixed to the base 10 and a flexed transitional end 36 positioned in biasing relationship against a pin 38 secured to the surface of blade 14. The clockwise rotational force exerted by the spring 32 upon diaphragm blade 14 serves to impose a corresponding counterclockwise rotational force upon blade 16 through the geared mechanical linkage between the blades. In the terminal or cocked position of the blades depicted in FIG. 1, a minimum aperture which the blades are called upon to define is present as indicated at 22. To provide for adequate translational rotation of the aperture blades from this minimum aperture position while maintaining structural compactness, semicircular indentations are formed respectively within blades 14 and 16 at 40 and 42.

A further examination of the shape of aperture blade 14 reveals an outwardly extending flange portion 44 within which is formed an elongate opening 46. Flange portion 44 is beveled inwardly at 48 such that its rear surface passes in relatively close proximity to an annular mounting 50 adapted to retain a light sensing element such as a photovoltaic cell or the like. The cell positioned within mounting 50 is aligned or oriented in a position for witnessing scene illumination. This photosensing cell arrangement is positioned with respect to the flange portion 44 such that the amount of photic stimulation which it receives is regulated by the area of the elongate opening 46 presented before it at any given time during an exposure sequence. Elongate slot 46 is selectively dimensioned for attenuating light reaching a photocell at 50 in correspondence with the aperture defining position of the blades 14 and 16. With such an arrangement a control circuitry utilized with the mechanism may be made responsive to relative aperture at any instant as well as to scene lighting.

In FIG. 1 the aperture blades are illustrated being retained in a cocked or terminal position by an aperture blade release arm 52. Arm 52 is mounted for rotation about a pivotal shaft 54 fixed to the base plate 10. The arm is configured having a latching tip 56 which releasably engages blade 14 by virtue of its insertion within a slot positioned in an outwardly bent flange 58 formed in the upward edge of blade 14. The arm 52 is biased for rotation in a clockwise direction by a wire spring 60 slidably wound about shaft 54. Spring 60 is configured having a stationary side abutting against an upstanding pin 62 and a transitional side arranged to hook over the upward edge of arm 52. Note that the pin 62 functions to limit the clockwise rotational travel of arm 52. The opposite tip of release arm 52 is configured to provide a circular cam surface 64. Cam tip 64 is arranged to make slidable contact with the underside of a release button shown in somewhat generalized fashion at 66. Downward movement of release button 66 will impose a counterclockwise rotation of arm 52 about pivot 54 so as to cause a release of the cocking engagement between tip 56 and flange portion 58 of blade 14. The downward movement of release button 66 will also cause a simultaneous actuation of switches $S_1$ and $S_2$, shown in FIG. 3 in generalized fashion. Release button 66 may also be used to actuate a mechanical or electrical exposure interval control function depicted in generalized block fashion at 68. A dotted line linkage between button 66 and functional block 68 is shown at 70.

Figure 2:
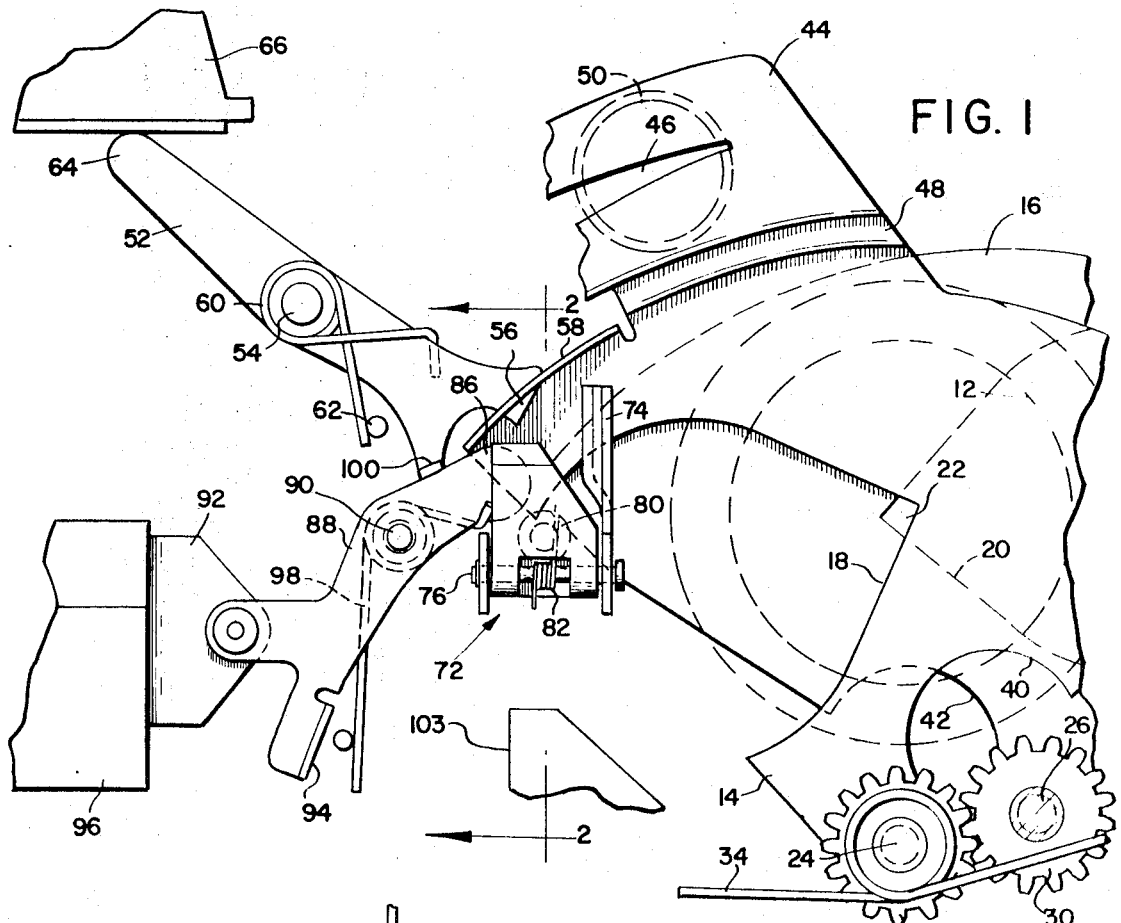
FIG. 2 is a cross-sectional view taken along the plane of line 2—2 in FIG. 1 showing a portion of the braking arrangement in more detail.

When release button 64 is depressed and release arm 52 is caused to rotate, the aperture blades will become unlatched and will open under the impetus of spring 32. This mutually separating movement of the blades continues until they are halted at a position defining an aperture dimension corresponding with an exposure evaluation. Such an evaluation is performed by a circuitry arrangement described hereinafter. To halt the motion of the blades at an appropriate aperture, a mechanical braking arrangement shown generally at 72 is mounted within the exposure mechanism. Since the aperture blades are mutually linked by gears 28 and 30, the braking arrangement 72 need work with only one of the blades, for instance blade 16. Referring to FIGS. 1 and 2, the brake arrangement is illustrated in an orientation permitting the free pivotal movement of the aperture blades 14 and 16. The brake comprises a mounting structure 74 fixed to the exposure mechanism and configured to position the braking elements of the arrangement a select distance from the surface of aperture blade 16. Mounting structure 74 is configured to support an axle 76 in a plane parallel to the surface of aperture blade 16. Pivotally mounted upon axle 76 is a braking member formed having a lever portion 78 extending from axle 76 toward the surface blade 16 and integrally connected retracting portion 80 extending oppositely therefrom.

Braking lever 78 is configured having a length greater than the selected distance from axle 76 to the surface of blade 16. As a consequence, the lever will be oriented at an angle with respect to the blade surface. A central opening is formed within the braking member to permit the insertion of a wire spring 82. Spring 82 is configured and arranged to bias lever portion 78 inwardly towards the surface of aperture blade 16. Toward the outer tip portion of lever portion 78 an opening is formed in the braking member which functions to retain a cylindrically shaped insert 84 formed of a brake shoe type material having a relatively high coefficient of kinetic friction with respect to the material from which the blade 16 is formed. Insert 84 may have a spherically shaped head portion for improving contact with the blade 16. Lever portion 78 of the braking member is held in the orientation illustrated in FIG. 2 by the tip 86 of a brake release arm 88. Arm 88 is rotatably attached to the base plate 10 at a pivot member 90. The opposite side of the release arm 88 includes an extension to which is pivotally attached a magnetizable keeper 92 and an outwardly bent flange 94. During a cocked status of the mechanism or while the blades 14 and 16 are opening, the tip 86 of arm 88 is held in abutting position against retracting portion 80 by virtue of the magnetic attraction between keeper member 92 and an energized electromagnet 96. A spring member 98 is attached to brake release arm 88 and functions to bias it for rotation in a counterclockwise direction. The force exerted by spring 98, however, is insufficient to overcome the attractive force between keeper 92 and energized electromagnet 96. To retain arm 88 in appropriate position during a cocked status of the mechanism, an extension 100 is provided in the aperture blade release arm 52. This extension contacts the upper edge of arm 88 causing it to assume an orientation wherein keeper 92 abuts electromagnet 96. This contact is held until arm 52 is rotated, at which time electromagnet 96 is energized.

Figure 4:
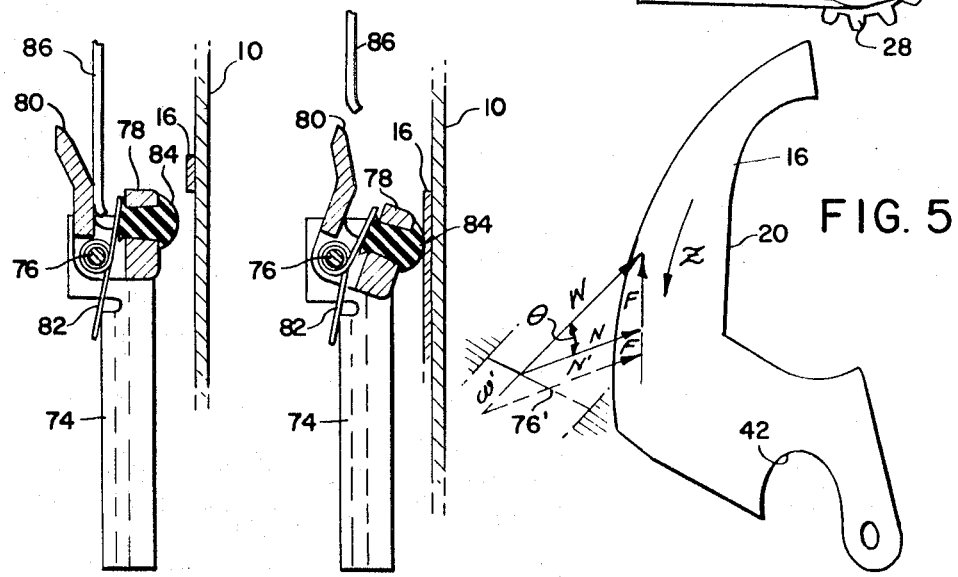
FIG. 4 is a cross-sectional view of the braking arrangement of the inventive system as pictured in FIG. 2, however, showing the lever arm of the brake in diaphragm blade engaging position.

As the aperture blades 14 and 16 rotate to a position defining an aperture opening corresponding with an exposure evaluation made by the system circuitry, the electromagnet 96 is de-energized, releasing keeper 92 and permitting the arm 88 to rotate in a counterclockwise direction. This rotation moves the tip 86 of arm 88 out of engagement with retracting portion 80 of the braking member. Note that extension 100 in arm 52 is rotated out of contact with arm 88 upon movement of release arm 52. With the movement of arm 88, lever portion 78 of the braking member pivots inwardly toward the surface of blade 16 under the bias of spring 82. As contact with the surface is made, the tip 86 will travel with the blade surface forcing it toward base plate 10, depending upon the flexibility of blade 16. The aperture defining system then assumes a status illustrated in connection with FIGS. 3 and 4, wherein the aperture blades have been braked and the blades 14 and 16 define an aperture opening 22 corresponding with an exposure evaluation derived in the circuitry of the mechanism. Note in FIG. 4 that a small portion of the spherical tip of insert 84 has contacted the surface of blade 16. The rear surface of the blade is flexed to wedge against the surface of back plate 10. As a consequence, a compressive force from the point of contact of tip 84 with the surface of blade 16 is imposed through the braking member toward the axle 76. This force provides a rapid and positive halting of any movement in blade 16. Inasmuch as blades 16 and 14 are linked mechanically, blade 14 is also halted.

Turning to FIG. 5, a vector analysis of the braking action provided by the lever portion 78 of the braking member is provided. The drawing illustrates blade 16 which is urged into an opening position by a force Z. Force Z is that ultimately provided by the bias imposed by spring 32 of the shutter blade mechanism. To halt motion of blade 16, a frictional force, designated by a vector F must be provided. Neglecting the restraint developed between base plate 10 and the rearward surface of blade 16, this frictional force F is imposed by the lever portion 78 of the braking member. By virtue of its angular orientation with the surface of blade 16, depicted at angle $\theta$, a compressional force W is formed in braking portion 78. Vector analysis of the force W will derive a normal force vector N and the requisite frictional force F. The force imposed at W is ultimately absorbed through axle 76 as indicated at 76' in the vector drawing. Should the force Z be increased, the corresponding compressive force W will be increased by the increment indicated at W'. The combined greater compressive force $W+W'$ may be analyzed to evolve a normal force N' and a frictional force $F+F'$ sufficient to counteract the added rotative force in blade 16.

From the above analysis, it may be observed that the only force required to actuate the braking arrangement is that exerted by the relatively low force value spring 82. The amount of travel required of the lever portion 78 is minimal and the mass of the braking member need not be significant. For instance, the member may be fabricated from plastic or the like. As an additional advantage, the braking arrangement is self-adjusting. For instance, as the tip of insert 84 wears through continued use, the consequent shortening of the lever arrangement will be taken up by a slight alteration in the angle of attack $\theta$ of the lever portion.

Returning to FIG. 3, a recocking arrangement for the aperture defining mechanism is provided by an arm 101 mounted upon base plate 10. Arm 101 is slidable across the base 10 and is formed having an upstanding tip having a canted surface 102 adapted to cam against pin 38 of aperture blade 14, thereby causing its counterclockwise rotation to a position permitting the relatching of latching arm tip 56 with the slot in aperture blade flange 58. Inasmuch as the aperture blades 204 and 206 are linked for mutual rotation, the recocking maneuver imposed upon blade 14 will also cause a corresponding repositioning of blade 16. Arm 101 also includes an upstanding tip 103 which is of dimension appropriate for making abutting contact with the flange 94 of brake release arm 88 as the recocking arm is moved from right to left. Such movement of arm 101 will rotate arm 88 in clockwise direction until keeper 92 is united with the electromagnet 96. Arm 88 is held in position before the energization of electromagnet 96 by extension 100 of arm 52.

Arm 101 is returned to standby position by virtue of a coil spring 104 tensioned between a pin 105 fixed to the lever and a pin 106 fixed to base plate 10. A pin 107 is fixed to base 10 for purposes of limiting the return motion of the arm 101.

Figure 6:
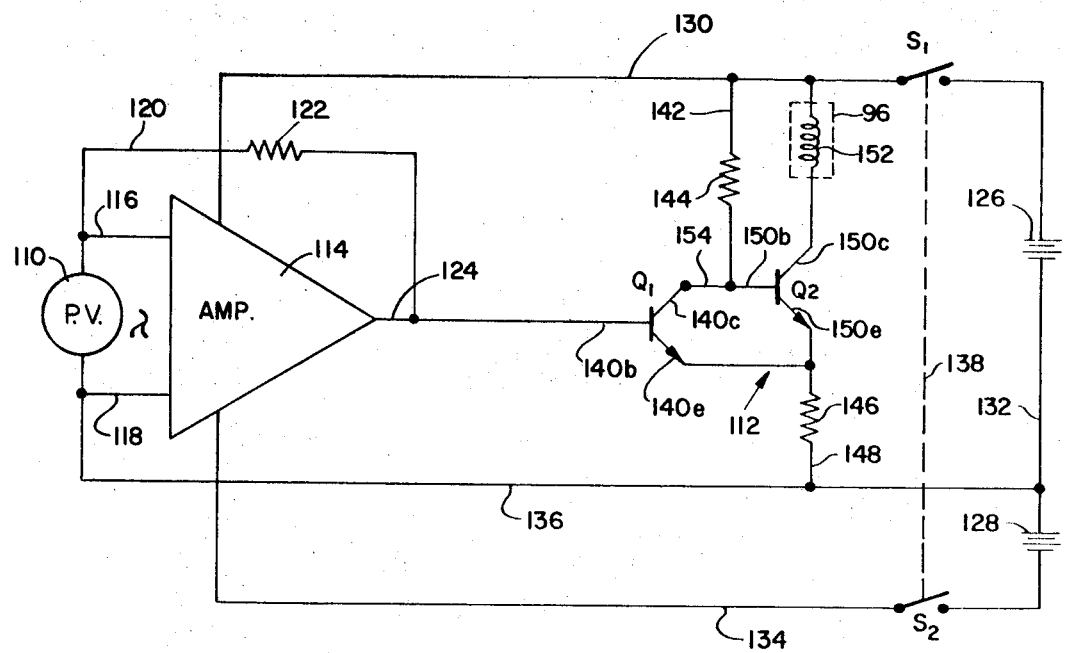
FIG. 6 is a circuit diagram showing a circuit arrangement for generating an output signal representative of an exposure evaluation and adapted for use with the mechanism depicted in connection with FIGS. 1 and 3.

Referring to FIG. 6, a circuitry for evaluating scene light levels and providing an input to the aperture regulating mechanism is portrayed. A variety of circuits will operate with the earlier described mechanism, including those configured to adjust aperture dimension for flash or similar artificial scene illumination. The circuit illustrated in the drawing utilizes a photovoltaic cell 110 in conjunction with a voltage sensitive trigger circuit shown generally at 112 to selectively energize and de-energize the electromagnet 96 described in connection with FIGS. 1 and 3. A photovoltaic cell as shown at 110 is ideally suited for the instant application inasmuch as it will provide a rapid response rate suited for use with the aperture blade opening dynamics at hand. To operate in conjunction with the aperture blade mechanism, photocell 110 is mounted as at 50, oriented with respect to the field of view of a scene being photographed. Interposed between this scene and the cell 110 is the elongate slot 46 of flange portion 44 of one opening blade 14. Slot 46 is configured such that the output of the photocell 110 will represent a function not only of scene light but also of aperture size or diaphragm orientation. The output signal of photovoltaic cell 110 is inserted into the input circuitry of a differential form of amplifier 114 at its input terminals 116 and 118. Amplifier 114 is of a variety sometimes referred to in the art as an "operational amplifier." When considered ideally, the amplifier 114 has infinite gain and infinite input impedance and zero output impedance. For the instant application, this variety of amplifier permits the photosensor 110 to operate within a relatively broad range of light levels. A feedback path 120 including a resistor 122 is included in the input circuitry of amplifier 114 between terminal 116 and output line 124 for purposes of adjusting gain and responding to the output signals generated at photovoltaic cell 110.

The circuitry is powered from a tapped power supply including batteries 126 and 128. Battery 126 is connected between lead 130 and line 132. Similarly, battery 128 is connected between line 122 and lead 134. Leads 130 and 134 are connected for power supply into amplifier 114 and a reference level or ground level lead 136 connects terminal 118 of the amplifier with the center tapping line 132 of the power source. The circuitry is energized upon the simultaneous closure of switches $S_1$ and $S_2$ respectively positioned in leads 130 and 134. A mechanical linkage between the switches providing for their simultaneous actuation is functionally depicted at 138.

The output of the photosensing circuitry including amplifier 114 and photocell 110 is provided as a voltage signal at output line 124. This signal is introduced to the voltage sensing trigger circuit 112 for selective energization of earlier described electromagnet 96, shown in the present drawing in dotted line functional fashion. The trigger circuit 112 has a normally nonconducting stage which includes a transistor $Q_1$ having base, collector and emitter electrodes 140b, 140c, and 140e, respectively. Collector electrode 140c of $Q_1$ is connected to lead 130 of the power source by a line 142 within which is inserted a bias resistor 144. Emitter electrode 140e of transistor $Q_1$ is connected to reference level lead 136 by biasing resistor 146 inserted in line 148. The normally conducting stage of circuit 112 includes a transistor $Q_2$ having base, collector and emitter electrodes respectively at 150b, 150c and 150e. Collector electrode 150c is connected to lead 130 through a coil 152 representing the energizing component of electromagnet 196. Consequently, electromagnet 96 is energized when transistor $Q_2$ conducts. Base electrode 150b of $Q_2$ is connected to collector electrode 140c of $Q_1$ through lead 154, and emitter electrode 150e of $Q_2$ is connected through bias resistor 146 to line 136. With this arrangement, there is essentially a common emitter resistor 146, the resistive value of which establishes a trigger voltage for circuit 112. While the two stages of circuit 112 have been characterized as "normally-conducting" and "normally-not conducting," it should be understood that this characteristic is applicable only when a voltage is present across lines 130 and 136.

As suggested earlier, the light sensing and triggering circuitry illustrated in FIG. 6 may be used in conjunction with the aperture blade regulating mechanism of FIGS. 1 through 5. In making an exposure, the photocell 110, now positioned as at 50 is exposed to scene light coincident with the field of view of the lens system of the camera. An exposure sequence is commenced with the depression of release button 66. As button 66 moves downward, power switches $S_1$ and $S_2$ are simultaneously closed to energize the circuitry of the system. Concurrently, aperture blade release arm 52 is caused to rotate in a counterclockwise direction, thereby unlatching aperture blade 14.

Switches $S_1$ and $S_2$ are held closed throughout the aperture regulation sequence by mechanical inertia imposed upon the return movement of button 66. Similarly, release arm 52 is held in position away from the blades during this sequence. The simultaneous actuation of switches $S_1$ and $S_2$ permits a corresponding energization of coil 152 by virtue of the conduction of transistor $Q_2$.

$Q_2$ conducts because the base electrode 150b thereof is gated through resistor 144 and lead 130. $Q_2$ continues to conduct, thereby permitting the continued energization of the coil 152, until the base electrode 140b of transistor $Q_1$ receives a triggering voltage. As a result of the energization of coil 152, the electromagnet 96 will hold keeper 92 against the bias of spring 98 and the tip 86 of brake release arm 88 will function to hold the retracting portion 80 of the braking member in an outward pre-braking position. This orientation of the braking assembly holds the contacting insert 84 of the brake lever arm away from contact with aperture blade 16.

With the unlatching of aperture blade 14, the mechanically linked blades 14 and 16 pivot under the bias of spring 32 in opposite directions toward a fully opened position. This opening movement is of a continuous nature and as it occurs the edges of notches 18 and 20 in the blades define a progressively enlarging aperture opening over the camera optical path. Simultaneously and in synchronism with the opening of the aperture before the optical path, elongate slot 46 of flange portion 44 of blade 14 is moved across the face of photovoltaic cell 110 positioned at 50. The amount of light permitted to impinge upon the photocell at 50 varies in coordinated fashion with the amount of light permitted to enter the optical path by coacting aperture notches 18 and 20. Note in this regard that at the initiation of the pivotal movement of the aperture blades, slot 46 presents only a minimal light transmittal area before the face of photovoltaic cell 110. As the pivotal movement of the aperture blades progresses, however, the amount of light permitted to reach the photovoltaic cell is increased to a maximum representing the largest aperture dimension available in the system. With such a synchronous relationship between the light permitted to pass through the optical path as a result of aperture size and of the amount of light permitted to reach the photovoltaic cell, the output signal of the cell 110 is controlled to represent a function of aperture size and of scene brightness. As notch 46 sweeps across the face of photocell 110, a voltage build-up will occur at amplifier output line 124. This voltage signal is presented to the voltage sensitive trigger circuit 112. When the voltage output signal at line 124 reaches a predetermined level, termed a "triggering level," transistor $Q_1$ of the voltage sensing triggering circuit 112 will be forward biased into conduction. The conduction of transistor $Q_1$ will function to reverse bias normally conducting transistor $Q_2$, thereby de-energizing coil 152 of electromagnet 96. The deenergization of electromagnet 96 will remove the attractive force imposed upon keeper 92, thereby permitting brake release arm 88 to rotate in a counterclockwise direction under the force of spring 98. This rotation will cause the brake shoe portion of the braking arrangement to move into and abruptly stop the movement of aperture blade 16. Inasmuch as blade 16 is mechanically linked with blade 14, blade 14 will stop simultaneously. Following an appropriate exposure interval as determined at block function 68, the exposure sequence will be terminated.

Recocking of the aperture control mechanism following an exposure is provided by moving arm 101 to the left such that the edge of its upstanding tip 102 forces the aperture blades to a latched minimum aperture position and the upstanding tip 103 returns keeper 92 into contact with electromagnet 96.

Figure 7:
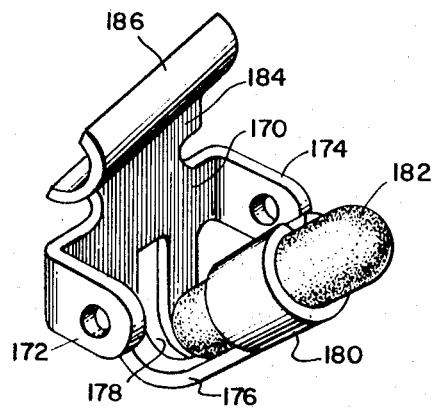
FIG. 7 is a pictorial representation of an alternate braking lever arrangement which may be used with the instant aperture defining system.

Referring to FIG. 7, an alternate embodiment for the braking member described in connection with FIGS. 1 through 5 is illustrated. The arrangement shown may be formed by stamping as opposed to molding and is pivotally mounted within the camera mechanism in the same manner as described in connection with the earlier embodiment. To provide this pivotal connection, the body portion 170 of the braking arrangement is formed having two extending taps 172 and 174 within which are formed circular holes for pivotal mounting with an axle or the like. The lever arm portion of the brake is formed as a curved extension 176 having a centrally disposed internal slot 178. The arm terminates in a clasped portion 180 which retains a cylindrically shaped contacting tip. Tip 182 may be fashioned of rubber or a material having a relatively high kinetic coefficient of friction with respect to the surface of the diaphragm blades. The retracting portion of the brake is shown at 184 and includes a contact portion 186 stamped having a semicircular cross-section for added strength. The rearward portion of section 186 is adapted for contact with the tip of a brake release arm as illustrated earlier at 86.

Since certain changes may be made in the above aperture regulating system without departing from the scope of the invention herein involved, it is intended that all matter contained in the above description or shown in the accompanying drawings shall be interpreted as illustrative and not in a limiting sense.

What is claimed is:

1. An exposure control system for photographic apparatus comprising:

aperture defining means having at least one element movable between terminal positions defining minimum and maximum exposure apertures over the optical path of said apparatus;

spring means for urging said element from one terminal position toward the other terminal position;

an aperture brake spaced from a surface of said element, having a lever portion mounted for pivotal contact therewith and operative to counteract any tendency of movement of said surface upon effecting said contact; and actuator means for causing said lever portion to selectively contact said surface for halting the said movement of said surface by said spring means to establish a selected exposure aperture by a wedging restraint resulting from the force derived from said spring means and exerted between said surface and said pivotal lever portion.

2. The control system of claim 1, in which said diaphragm brake lever portion is pivotally mounted at a fixed position spaced a select distance from said element surface.

3. The control system of claim 1 wherein said lever portion is oriented to extend to said contact in a direction opposite the direction of travel of said element surface.

4. The control system of claim 3 wherein said pivotal mount is configured to pivot said lever portion about an axis oriented transversely to the direction of travel of said element surface.

5. The control system of claim 1 in which said diaphragm brake lever portion is pivotally mounted at a fixed position spaced a select distance from said element surface and is configured and arranged to provide said surface contact at an angle with said surface other than 90°.

6. The control system of claim 1 in which said diaphragm brake lever portion is pivotally mounted at a fixed position spaced a select distance from said element surface and is configured having an end portion for effecting said surface contact, said end portion surface contact extending from said pivotal mounting a distance greater than said mounting to element surface spacing.

7. The exposure control system of claim 6 wherein said braking lever end portion is formed of a flexible material for improving the frictional relationship at said contact between said aperture means element surface and the end portion.

8. The exposure control system of claim 1 including brake spring means for biasing said lever portion toward a position effecting said contact with said element surface; and wherein said brake lever portion is pivotally mounted a fixed distance from said element surface and is configured having a length from said surface contact to said pivotal mounting which is greater than said fixed distance.

9. The exposure control system of claim 8 wherein said brake spring means is selected having a biasing force value substantially less than the force value required of said blade spring means.

10. The exposure control system of claim 8 including base plate means configured and arranged with respect to said movable element for supporting the element against said exerted force when said element is under said wedging restraint.

11. The exposure control system of claim 1 in which said diaphragm brake includes:
 brake spring means for biasing said lever portion toward a position of said contact with said surface;
 retraction means coupled with said lever portion and responsive to said actuator means for selectively restraining said lever portion in a prebraking position; and
 wherein said brake lever portion is pivotally mounted a fixed distance from said element surface and is configured having a length from said surface contact to said pivotal mounting which is greater than said fixed distance.

12. The exposure control system of claim 11 wherein said brake spring means is selected having a biasing force value substantially less than the force value required of said blade spring means.

13. The exposure control system of claim 11 wherein said aperture defining means comprises at least two elements mutually linked for movement in aperture defining cooperative relationship.

14. The exposure control system of claim 13 wherein said aperture means elements are configured to define continuously variable exposure apertures between said terminal positions.

15. An exposure control system for photographic apparatus comprising:
 aperture defining diaphragm blade means having at least one element movable between terminal positions defining minimum and maximum exposure apertures over the optical path of said apparatus;
 drive means for urging said blade means from one terminal position toward the other terminal position;
 braking means spaced from a surface of said element and pivotal into contact therewith for compressively assuming a force counteracting any tendency of movement of said element by said drive means upon making said contact; and
 actuator means for causing said braking means to contact said surface and arrest the said movement of said element at a position defining a selected aperture.

16. The exposure control system of claim 15 wherein said braking means comprises a braking lever pivotally mounted upon said apparatus a fixed distance from said movable surface and having an end portion for effecting said surface contact whereby said lever assumes said counteracting force between said end portion and said pivot.

17. The exposure control system of claim 16 wherein said braking lever is dimensioned having a length extending from said end portion surface contact to said pivotal mount which is greater than said fixed distance between said element surface and said pivotal mount.

18. The exposure control system of claim 15 wherein said lever portion is oriented to extend to said contact in a direction opposite the direction of travel of said element surface.

19. The exposure control system of claim 18 wherein said pivotal mount is configured to pivot said lever portion about an axis oriented transversely to the direction of travel of said element surface.

20. The exposure control system of claim 15 in which said braking means comprises:
 a braking lever pivotally mounted upon said apparatus a fixed distance from said movable element surface and having an end portion for effecting said surface contact whereby said lever assumes said counteracting force between said end portion and said pivot; and
 spring means for biasing the braking lever toward a position of said contact with said element surface.

21. The exposure control sysem of claim 15 in which said braking means comprises:
 a braking lever pivotally mounted upon said apparatus a fixed distance from said movable element surface and having an end portion for effecting said surface contact, whereby said lever assumes said counteracting force between said end portions and said pivot;
 spring means for biasing the braking lever toward a position of said contact with said element surface; and
 retraction means coupled with said lever and responsive to said actuator means for selectively restraining said lever in a prebraking noncontacting position.

22. An exposure control system for photographic apparatus comprising:
 base plate means for mounting the optical path instrumentalities of said apparatus;
 a diaphragm mechanism including at least two aperture blade elements mounted upon said base plate means, mutually and synchronously coactive between terminal positions defining minimum and maximum exposure apertures of said path and configured to define continuously variable apertures between said terminal positions;
 drive means for urging said blade means from one said terminal position toward the other terminal position;
 a braking lever pivotally mounted a select distance from a surface of at least one said element, having an end portion contactable therewith and operative to counteract any tendency of movement of said elements by said drive means upon making said contact;
 retraction means coupled with said lever for selectively maintaining said lever in an orientation preventing said surface contact; and
 actuator means operatively linked with said retraction means for causing said braking lever to selectively contact said surface, whereby the said movement of the surface is halted at a selected exposure aperture by a wedging restraint resulting from the force derived from said drive means and exerted between said braking lever, said element surface and a surface of said base plate means.

23. The exposure control system of claim 22 including brake spring means for biasing said braking lever toward a position effecting said contact with said element surface.

24. An exposure control system for photographic apparatus comprising:
 base plate means for mounting the optical path instrumentalities of said apparatus;
 a diaphragm mechanism including at least two aperture blade elements mounted upon said base plate means, mutually and synchronously coactive between terminal positions defining minimum and maximum exposure apertures over said path and configured to define continuously variable apertures between said terminal positions;
 drive means for urging said blade means from one said terminal position toward the other terminal position;
 a braking lever pivotally mounted a select distance from a surface of at least one said element, having an end portion contactable therewith and operative to counteract any tendency of movement of said elements upon making said contact;

retraction means coupled with said lever for selectively maintaining said lever in an orientation preventing said surface contact; and actuator means operatively linked with said retraction means and including circuit means having at least one photosensitive element responsive to the light levels of a scene being photographed for causing said braking lever to selectively contact said surface, whereby the said movement of the surface is halted at an exposure aperture selected in correspondence with the light level of said scene by a wedging restraint resulting from the force derived from said drive means and exerted between said braking lever, said element surface and a surface of said base plate means.

25. The exposure control system of claim 22 wherein said lever portion is oriented to extend to said contact in a direction opposite the direction of travel of said element surface.

26. The exposure control system of claim 25 wherein sid pivotal mount is configured to pivot said lever portion about an axis oriented transversely to the direction of travel of said element surface.

27. The exposure control system of claim 24 wherein said braking lever is dimensioned having a length between said end portion surface contact and said pivotal mounting which is greater than said pivotal mounting to element surface spacing.

28. The exposure control system of claim 27 wherein at least one said blade element is configured and arranged for attenuating scene light incident upon said photosensitive element in corresponding relationship with the instantaneous aperture defined by said blade elements.

29. The exposure control system of claim 28 in which said drive means is operative to urge said aperture defining blade elements from a position defining a minimum aperture at one terminal position to the maximum aperture of the system at the said other terminal position.

References Cited

UNITED STATES PATENTS

| | | | |
|---|---|---|---|
| 3,000,281 | 9/1961 | Rentschler | 95—10 C |
| 3,053,985 | 9/1962 | Grammer Jr., et al. | 95—10 C X |
| 3,139,804 | 7/1964 | Jakob et al. | 95—64 X |
| 3,393,619 | 7/1968 | Albedyll et al. | 95—64 X |
| 3,421,427 | 1/1969 | Starp | 95—10 C X |
| 3,466,447 | 9/1969 | Fahlenberg | 95—10 C UX |
| 3,482,497 | 12/1969 | Ernisse | 95—10 C |

SAMUEL S. MATTHEWS, Primary Examiner

J. F. PETERS, JR., Assistant Examiner

U.S. Cl. X.R.

95—64 R